US011834205B1

(12) United States Patent
Dunford et al.

(10) Patent No.: US 11,834,205 B1
(45) Date of Patent: Dec. 5, 2023

(54) SPACECRAFT CHASSIS AND COMPONENT CONFIGURATION

(71) Applicant: Space Exploration Technologies Corp., Hawthorne, CA (US)

(72) Inventors: Joshua A. Dunford, Kirkland, WA (US); Garrett P. Simard, Seattle, WA (US); Samuel T. Reineman, Kirkland, WA (US); McKenzie W. Read, Beloit, WI (US); Brent Crabtree, Seattle, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 193 days.

(21) Appl. No.: 17/094,409

(22) Filed: Nov. 10, 2020

Related U.S. Application Data

(60) Provisional application No. 63/022,279, filed on May 8, 2020, provisional application No. 62/933,496, filed on Nov. 10, 2019.

(51) Int. Cl.
*B64G 1/58* (2006.01)
*B64G 1/42* (2006.01)
*B64G 1/66* (2006.01)

(52) U.S. Cl.
CPC .............. *B64G 1/58* (2013.01); *B64G 1/425* (2013.01); *B64G 1/428* (2013.01); *B64G 1/66* (2013.01)

(58) Field of Classification Search
CPC .......... B64G 1/58; B64G 1/425; B64G 1/428; B64G 1/66
See application file for complete search history.

(56) References Cited

U.S. PATENT DOCUMENTS

| | | | | |
|---|---|---|---|---|
| 5,273,815 A | * | 12/1993 | Brydon | H01Q 1/422 428/688 |
| 5,806,800 A | * | 9/1998 | Caplin | B64G 1/503 165/41 |
| 5,823,476 A | * | 10/1998 | Caplin | B64G 1/503 165/274 |
| 5,823,477 A | * | 10/1998 | York | B64G 1/503 165/41 |
| 6,003,817 A | * | 12/1999 | Basuthakur | B64G 1/50 701/13 |
| 6,511,021 B1 | * | 1/2003 | Keramidas | B64G 1/503 244/171.8 |
| 7,174,950 B2 | * | 2/2007 | Jacque | F28D 15/0275 165/41 |
| 7,270,302 B1 | * | 9/2007 | Wong | B64G 1/503 244/171.8 |
| 7,324,348 B2 | * | 1/2008 | Berg, Jr. | H05K 7/186 361/752 |
| 7,967,256 B2 | * | 6/2011 | Wong | B64G 1/506 244/171.8 |

(Continued)

FOREIGN PATENT DOCUMENTS

JP           6945977 B2 * 10/2021 ........... B29C 64/386

*Primary Examiner* — Valentina Xavier
(74) *Attorney, Agent, or Firm* — Polsinelli PC (57) ABSTRACT

A spacecraft chassis includes a chassis body defined by first and second opposing sides bound by a perimeter, wherein at least one heat-generating component is configured to be secured directly to the chassis body, and at least one heat dissipating feature configured to radiate heat generated from the at least one heat-generating component into outer space.

20 Claims, 4 Drawing Sheets

(56) References Cited

U.S. PATENT DOCUMENTS

| | | | |
|---|---|---|---|
| 8,240,612 B2* | 8/2012 | Jondeau | B64G 1/50 244/171.7 |
| 10,681,837 B1* | 6/2020 | Davis | B64G 1/10 |
| 11,117,687 B2* | 9/2021 | Liu | B64G 1/226 |

* cited by examiner

SPACECRAFT CHASSIS AND COMPONENT CONFIGURATION

CROSS-REFERENCE TO RELATED APPLICATIONS

The present application claims priority to U.S. Provisional Patent Application No. 62/933,496 filed Nov. 10, 2019 entitled "SPACECRAFT CHASSIS AND COMPONENT CONFIGURATION," and U.S. Provisional Patent Application No. 63/022,279 filed May 8, 2020 entitled "SPACECRAFT CHASSIS AND COMPONENT CONFIGURATION," the contents of which are hereby incorporated by reference in their entirety.

BACKGROUND

To reduce launch costs, many launch vehicles (or rockets) used to carry a payload into outer space have been designed to simultaneously carry a plurality of spacecraft such as, for example, a plurality of satellites. In one approach, the launch vehicle includes a dedicated dispenser system, which separately supports each spacecraft during lift-off and then individually dispenses each spacecraft in orbit. However, such a system tends to be bulky and heavy, which reduces the useable payload that can be carried into orbit by the launch vehicle.

In another approach, a system for deploying spacecraft from a launch vehicle may include securing one or more spacecraft in layers in a stack, where each spacecraft in each layer is releasably secured to adjacent layers of one or more spacecraft. Various structures and methods have been developed for separating, releasing, and/or deploying each spacecraft from the stack into outer space.

Embodiments of the present disclosure are directed to spacecraft configurations optimal for stacked launch configurations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a spacecraft chassis includes a chassis body defined by first and second opposing sides bound by a perimeter, wherein at least one heat-generating component is configured to be secured directly to the chassis body, and at least one heat dissipating feature configured to radiate heat generated from the at least one heat-generating component into outer space.

In another aspect, a spacecraft includes a chassis having a chassis body defined by first and second opposing sides bound by a perimeter and at least one heat dissipating feature that is configured to radiate heat into outer space. The spacecraft further includes at least one heat-generating component mounted to the chassis body such that heat may be transferred from the least one heat-generating component to the chassis body.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top", "bottom", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Figure 1:
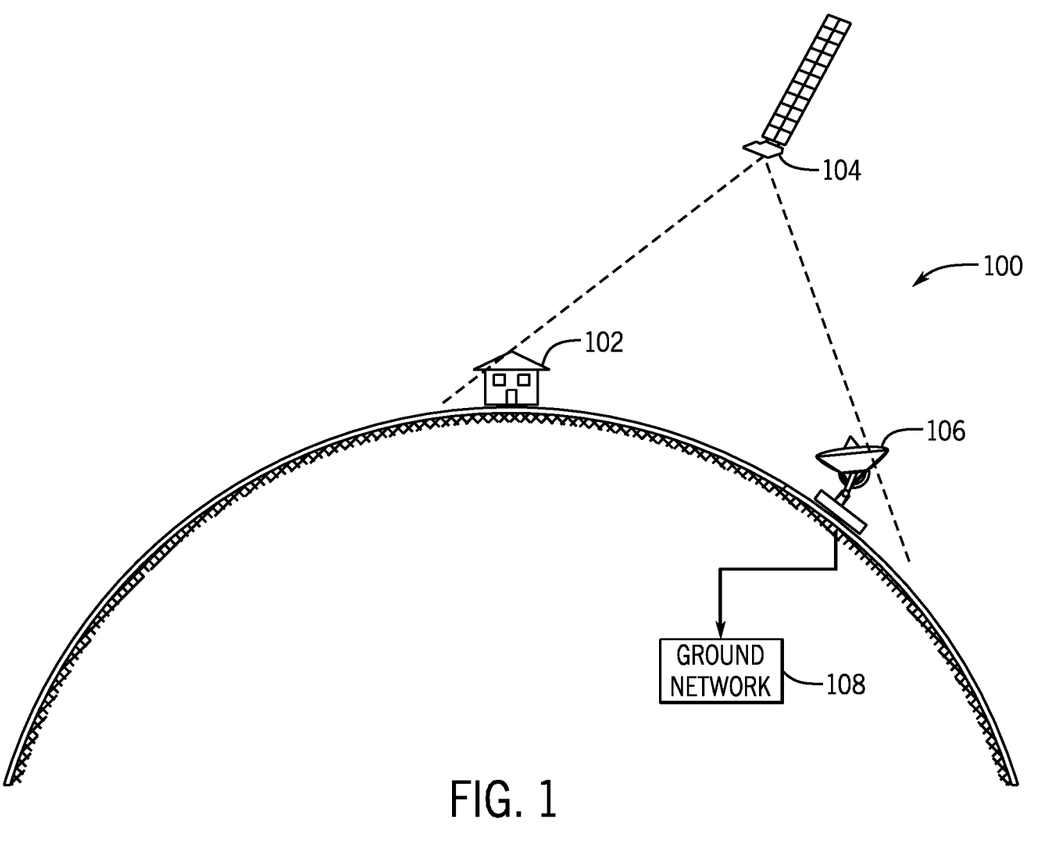
FIG. 1 depicts a schematic diagram of an example satellite communication system.

Systems are currently being deployed in order to provide high-bandwidth, low-latency network communication via constellations of satellites in low Earth orbit. FIG. 1 is a not-to-scale schematic diagram that illustrates a simple example of communication in such a system. An endpoint terminal 102 is installed at a house, a business, a vehicle, or another location where it is desired to obtain communication access via the satellite network. A communication path is established between the endpoint terminal 102 and a first satellite 104. The first satellite 104, in turn, establishes a communication path with a gateway terminal 106. The gateway terminal 106 is physically connected via fiber optic, Ethernet, or another physical connection to a ground network 90. The ground network 90 may be any type of network, including the Internet.

Latency of communication between the endpoint terminal 102 and the ground network 90 is determined at least in part by the distance between the endpoint terminal 102 and the satellite 104, and the distance between the satellite 104 and the gateway terminal 106.

For previous satellite communication systems that used satellites in geosynchronous or geostationary Earth orbit (GEO), the large distances involved created high amounts of latency. Therefore, it is desirable to use constellations of satellites in low Earth orbit (LEO) instead.

Embodiments of the present disclosure are directed to spacecraft chassis layouts including the antenna systems and configurations to optimize network communications to and from the satellite in LEO applications and other applications.

Figure 2:
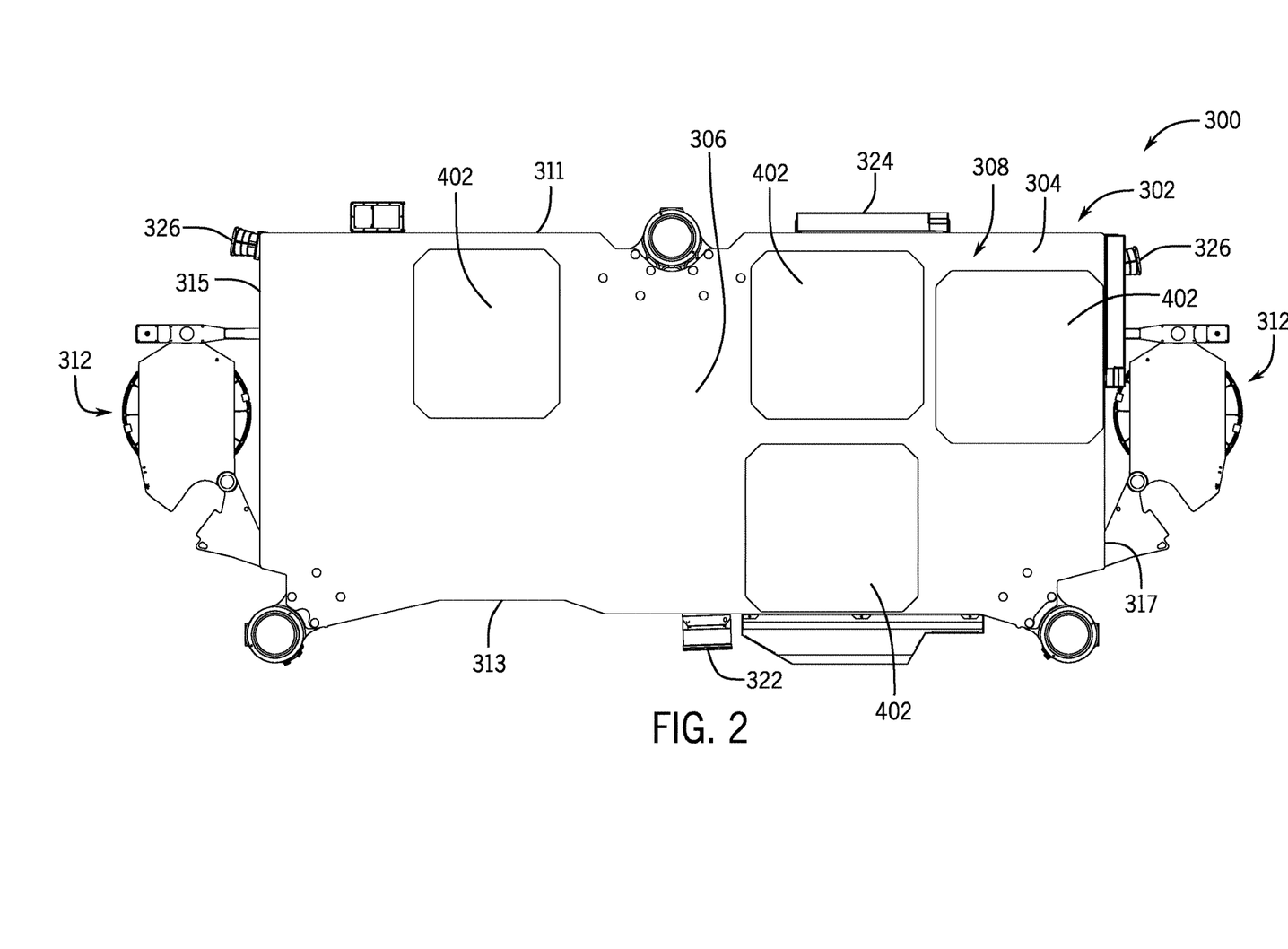
FIG. 2 depicts a first (earth-facing) side of a spacecraft.
Figure 3:
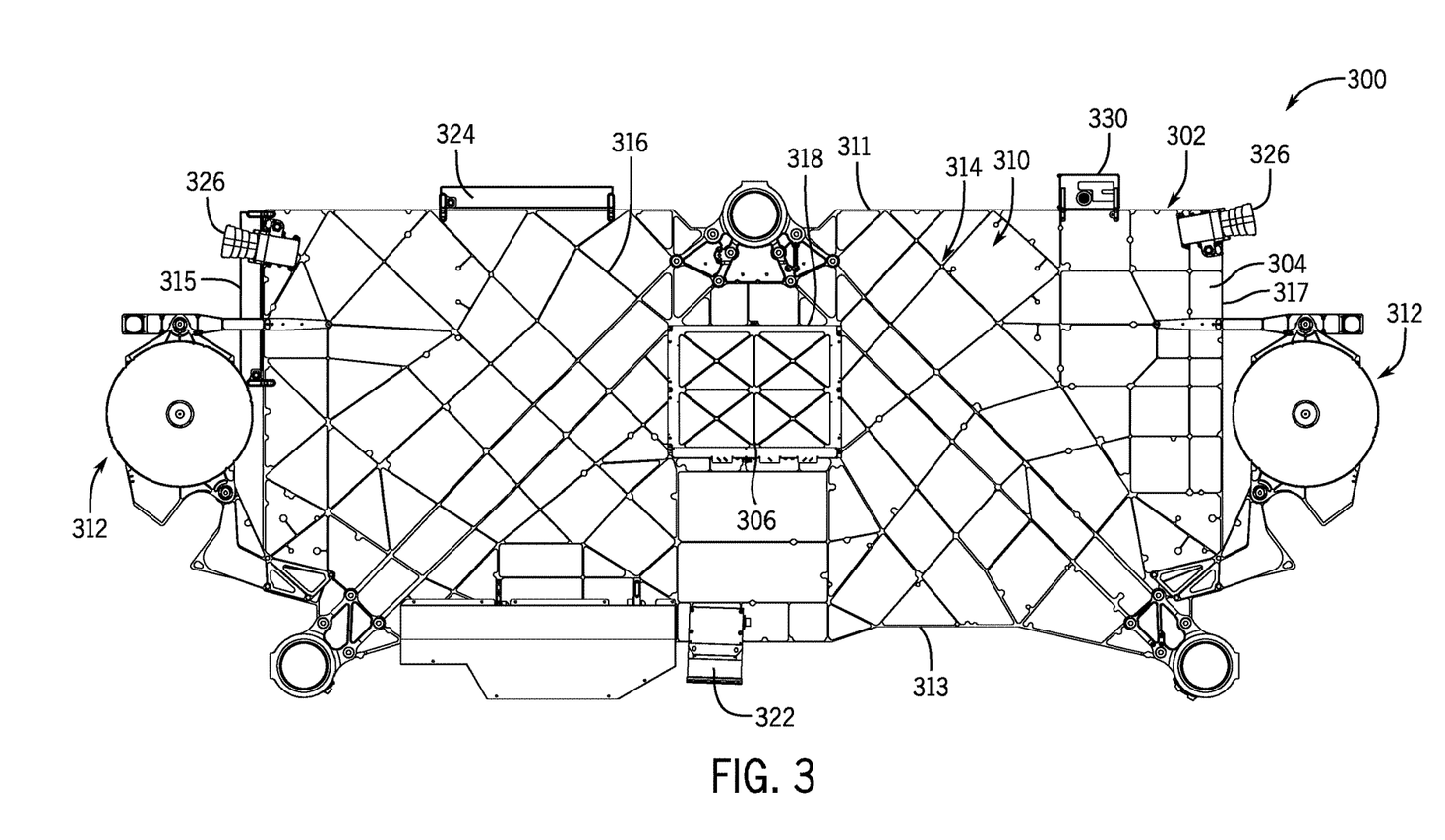
FIG. 3 depicts a second (outer space-facing) side of the spacecraft, wherein the solar array is not shown for clarity.
Figure 4:
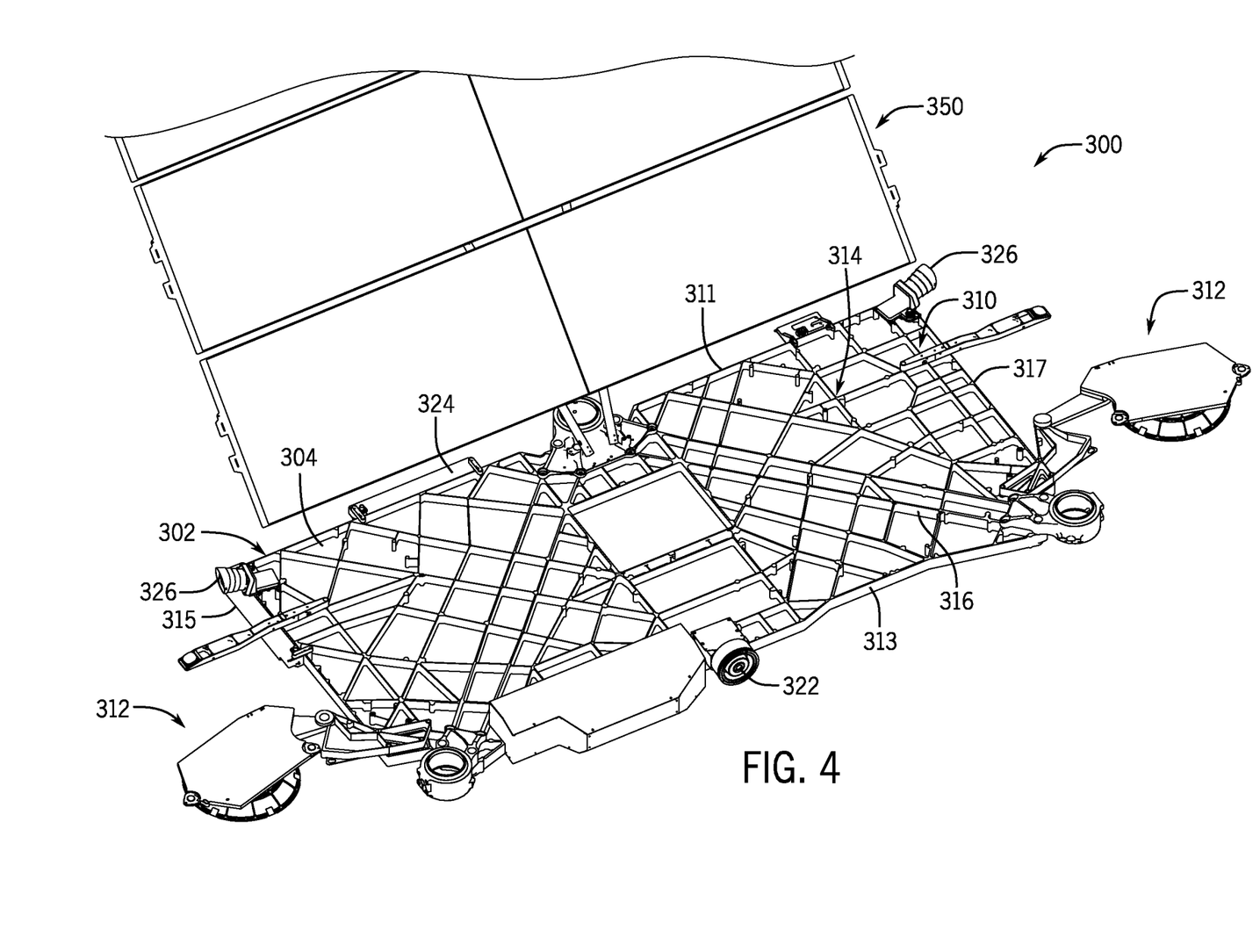
FIG. 4 is an isometric view of a spacecraft deployed in outer space with an antenna system tracking a gateway antenna on earth.

Referring to FIGS. 2-4, a spacecraft 300 in accordance with exemplary embodiments of the present disclosure will now be described. In general, the spacecraft 300 includes a chassis 302 that is a structural support for the spacecraft 300, designed and configured for carrying various components of the spacecraft 300. At the same time, the chassis 302 generally acts as a thermal radiating body, or a heat sink, to dissipate and radiate heat generated by at least some of the various components of the spacecraft 300. The layout of components on the spacecraft 300 is also optimal for maximizing the payload capacities and minimizing the overall mass and part count of the spacecraft.

The chassis 302 will first be described in detail. As noted above, the chassis 302 acts both as a primary structure for carrying the spacecraft components as well as a heat sink for the mounted components. Regarding its function as a primary structure, the chassis 302 includes a chassis body 304 that may be any suitable shape and configuration for carrying the desired components during launch and in outer space. In the depicted exemplary embodiment, the chassis body 304 is generally an elongated, flattened solid plate or panel on which various components may be mounted or otherwise integrated.

More particularly, the chassis body 304 has an overall substantially flattened rectangular shape defined by first and second, or earth-facing and outer space-facing opposing sides 308 and 310 bounded by first and second opposing generally elongated edges 311 and 313 and first and second opposing shortened edges 315 and 317. The second or outer-space-facing side 310 of the chassis body 304 carries the solar array 350 for harnessing solar energy from the sun (see FIG. 4).

As noted above, in addition to functioning as a primary structure for the mounted spacecraft components, the chassis 302 also functions as a heat sink for the mounted components. Traditional spacecraft use honeycomb panel configurations as a primary structure for maximizing strength to weight ratios. In such traditional spacecraft, high power, heat-generating (e.g., payload) components are typically housed in electronics boxes for structurally securing the components to the honeycomb panel chassis and for sinking heat generated from the components. However, in the illustrated embodiment, the chassis body 304 also functions as a thermal radiator or heat sink, and as a result, enclosure of the heat-generating components in an electronics box or the like is unnecessary.

To that end, in one embodiment of the present disclosure, the heat-generating components are coupled or mounted directly to the chassis body 304 such that a substantial portion of the heat generated by the mounted components is conducted directly to the chassis body 304. In effect, the chassis body 304 acts as a heat sink and radiator to outer space for the thermal energy generated by the heat-generating components. To enhance its heat sink capabilities, the chassis 302 may include a suitable heat-dissipating feature(s) for exchanging heat with outer space.

In the illustrated embodiment, the chassis 302 includes a patterned cellular grid fin structure 314 for maximizing the exchange of heat with outer space. The cellular grid fin structure 314 may be defined by a plurality of transverse fins or walls 316 extending from the surface of the second, outer space-facing side 310 of the chassis body 304. As can be appreciated by one of ordinary skill, forming heat-radiating features, such as fins, in a traditional honeycomb primary structure would be extremely difficult.

The walls 316 are of a suitable pattern, height, thickness, etc., to function as additional radiator area for heat dissipation of the mounted components from the chassis body 304. For instance, in the embodiment shown, the walls 316 extend around the entire perimeter of the chassis body 304, effectively defining the generally elongated edges 311 and 313 and shortened edges 315 and 317 of the chassis body 304. The walls 316 may extend diagonally and/or transversely from the edges 311, 313, 315, and 317 across the surface of the outer space-facing side 310 of the chassis body 304 to define a pattern suitable for the mounting and/or heat-dissipating requirements of the mounted components.

Moreover, the cellular grid fin structure 314 may extend across substantially the entire surface of the second, outer space-facing side 310, or it may instead cover only a portion of the second, outer space-facing side 310. Along the same lines, the density of the grid 314 may vary in certain areas of the chassis body 304 depending on chassis mounting and/or heat dissipation requirements. For instance, the grid 314 may be denser in the center of the chassis body or in other areas where heat-generating components are located (either on the same or opposite side of the chassis body 304). In the embodiment shown, the transverse walls 316 define a denser grid pattern near the center of the chassis body 304, whereas the grid pattern is sparser near certain perimeter portions of the chassis body 304. It should be appreciated that a patterned cellular grid fin structure or similar may also be defined on a portion or all of the first, earth-facing side 308 in addition to or in lieu of the grid defined on the second side 310.

The cellular grid fin structure 314 also provides the added benefit of stiffening and strengthening the chassis 302. For instance, the plurality of walls 316 may be of a suitable height and thickness to increase the out-of-plane compression and shear properties of the chassis 302. By using walls 316 to strengthen the chassis 302, as opposed to simply increasing the thickness of the chassis body 304, the amount of material used to reach the desired chassis strength is minimized. In other words, the walls 316 effectively increase the overall thickness of the chassis 302 (and therefore increase the chassis strength) without significantly increasing the chassis weight or material cost. As with the heat-dissipating function, the density of the grid 314 may vary in certain areas of the chassis body 304 depending on chassis strength requirements.

A manner in which the heat-generating components are mounted to the chassis 302 will now be described. Referring to FIG. 2, the first, Earth-facing side 308 has suitable mounting and heat-conducting features for mounting heat-generating components directly to the flat Earth-facing side 308 of the chassis body 304. For instance, in the illustrated embodiment, the first side 308 of the chassis body 304 generally includes mounting devices or features (not shown) for mounting printed circuit boards (PCBs), such as PCBs 402, or other hot components directly to the chassis body 304. In that regard, the chassis body 304 essentially acts as the electronics box or enclosure for the heat-generating component.

Eliminating electronics boxes or other enclosures reduces the thermal resistance between the high power payload components and the chassis body 304. More specifically, the components can reject their heat directly into the chassis body 304 rather than through the less efficient path of the electronics box or other enclosure. In other words, the distance and the number of interfaces between the component and the heat sink is minimized. Therefore, the payload components can run at higher power than components contained in electronics boxes. Moreover, without electronics boxes or other enclosures, the overall weight and part count of the spacecraft 300 is reduced, allowing for easier installation and increased payload capacity.

Any suitable coupling devices may be used to mount the heat-generating components to the chassis body 304, such as threaded holes (not labeled) in the chassis body 304 that are configured to receive fasteners (e.g., screws) passing through the component (such as through the substrate of the PCB). Heat sink contact pads or other thermal gap fillers (not shown) may be disposed between the heat-generating components and the chassis body 304 to provide a conductive path from the components directly to the chassis body 304.

Referring to FIG. 3, heat-generating components may be mounted to the second side 310 of the chassis body 304 by suitable coupling devices, such as threaded holes (not labeled) that are configured to receive screws passing through the component, as described above. In that regard, the walls 316 may be recessed or otherwise formed to accommodate the mounting of any component directly to the chassis body 304, which would again be difficult with a honeycomb structure.

The chassis 302 (including the chassis body 304 and its mounting components) is made from a suitable material for both acting as a primary structure for the mounted heat-generating components and for conducting and radiating heat from the various mounted components into outer space. In one non-limiting example, the chassis 302 is made from a suitable metal, such as aluminum or aluminum alloy. Other suitable materials may include machined magnesium.

As noted above, the layout of components on the spacecraft 300 is also optimal for maximizing the payload capacities and minimizing the overall mass and part count of the spacecraft. In that regard, the components of the spacecraft 300 carried by the chassis 302 may include payload components, power storage and distribution components, and low heat components. Depending on the heat generated by the component or other requirements of the component (such as field-of-view requirements, wiring connections, etc.), the components may be strategically located on the chassis body 304 in a manner that optimizes heat dissipation through the chassis body 304.

In one aspect, the directly mounted payload components may be in a spaced arrangement on the chassis body 304 to help provide a sufficiently large heat sink area around each payload component for dissipating the heat of the payload component. Exemplary payload components may include but are not limited to phased array transmit and receive panels, the satellite network computer, and modem boards.

The open portion of the chassis body 304 (i.e., the chassis body space or generally open area of the chassis body 304 having no high heat-generating components and/or having no mounted components) surrounding the payload component may be generally proportional to the heat generated by the directly mounted payload component and/or the heat that needs to be dissipated from the component to the chassis body 304. In that regard, higher heat-generating payload components may have a larger surrounding open chassis area compared to lower heat-generating payload components. With the payload components directly coupled to the chassis body 304, the heat of the payload component may dissipate through the surrounding open area of the chassis body 304.

To maximize the use of the chassis body 304 as a heat sink for the directly mounted payload components, the payload components may be located on both the first and second sides 308 and 310 of the chassis body 304. Locating the payload components on both the first and second sides 308 and 310 of the chassis body 304 maximizes the open chassis area surrounding each component to help distribute the heat dissipation throughout the chassis body 304. Although the use of an open surrounding chassis area for dissipating heat is described for use of payload components, it should be appreciated that other directly mounted, heat-generating components of the spacecraft may also benefit from such strategic spacing.

In another aspect, power storage and distribution components, or components that generally command and/or control other components on the spacecraft 300, such as, for instance, a battery 318 and a flight computer (not shown) may be located at or near a chassis center 306. In order to provide power to other components on the spacecraft 300, the power storage and distribution components are typically coupled to the other components on the spacecraft 300 through power harnesses generally formed from heavy copper wire. Such centering of these components helps reduce the length and mass of the heavy power harness connections for overall weight reduction in the spacecraft 300.

In yet another aspect, low heat components may be positioned near the edges 311, 313, 315, and/or 317 of the chassis body 304 or even cantilevered off the chassis body 304 to maximize the footprint of the chassis as a heat sink for the heat-generating components. For instance, some components have low power requirements and generate little to no heat; and therefore, they do not require heat dissipation to the heat sink (i.e., chassis body 304). Such components may include a thruster 322, thruster propellant containers (not separately labeled), torque rods 324, solar array steering actuators (not separately labeled), and reaction wheels (not separately labeled). Certain low heat components may also have field-of-view requirements, such as antenna systems 312 (such as phased array antenna systems), star trackers 326, magnetometers (not shown), tracking and telemetry radios 330, cameras (not shown), and GPS antennas (not shown). Low heat components may be enclosed in a traditional enclosure since dissipation of heat to the chassis body 304 is not needed.

With field-of-view requirements, component positioning along the perimeter of the chassis body 304 or cantilevered from the chassis body 304 is optimal. Moreover, by being cantilevered from the chassis body 304, such as with one or more brackets or other mounting structures, the overall mass of the chassis 302 is minimized without compromising its heat sinking capacity. In other words, the low heat components do not occupy the valuable heat sink real estate of the spacecraft 300. Thus, the heat sink area of the spacecraft 300 is maximized.

Beyond part count reduction and ease of assembly, the exemplary spacecraft layout described and illustrated herein results in a very high power to mass ratio for the spacecraft. As can be appreciated by those skilled in the art, the power capacity of a spacecraft, such as a communications satellite, corresponds to its money-making potential. More specifically, the mass of a spacecraft is typically an indicator of the cost associated with its launch because rockets are frequently mass-limited. Launch costs can be a large fraction of the cost of deploying the spacecraft.

To illustrate this point, the inventors gathered data comparing the power to mass ratio for a spacecraft generally configured in the manner described and illustrated herein and prior art spacecraft having similar payload configurations. The "Sample 1.0" spacecraft is generally configured in the same manner as the spacecraft 300 described and illustrated herein.

| Spacecraft | Power (Watts) | Mass (kilogram) | Power/Mass (W/kg) |
| --- | --- | --- | --- |
| Sample 1.0 | 3300 W | 261 kg | 12.6 W/kg |
| Boeing 702 | 12000 W | 4000 kg | 3 W/kg |
| Lockheed A2100 | 15000 W | 66740 kg | 2 W/kg |
| Nasa Deep Space 1 (DS1) | 2500 W | 486 kg | 5 W/kg |
| Nasa Dawn | 10000 W | 1217.7 kg | 8 W/kg |

As can be appreciated from the foregoing, the Sample 1.0 spacecraft has a significantly higher power to mass ratio when compared to prior art spacecraft having similar payload configurations. In other words, a spacecraft 300 formed in accordance with the present disclosure can distribute more power with less mass, or it has a higher specific power than traditional spacecraft of similar payload configurations.

While illustrative embodiments have been illustrated and described, it will be appreciated that various changes can be made therein without departing from the spirit and scope of the disclosure.

LISTING OF EXEMPLARY INNOVATIONS

A spacecraft chassis includes a chassis body defined by first and second opposing sides bound by a perimeter, wherein at least one heat-generating component is configured to be secured directly to the chassis body, and at least one heat dissipating feature configured to radiate heat generated from the at least one heat-generating component into outer space.

In one aspect, the at least one heat dissipating feature includes a plurality of fins extending substantially transversely from a surface of at least one of the first and second opposing sides.

In one aspect, the fins define a patterned cellular grid.

In one aspect, the chassis body is an elongated solid flat panel.

In one aspect, the spacecraft chassis further includes at least one mounting feature defined on at least one of the first and second opposing sides that is configured to secure the at least one heat-generating component directly to the chassis body.

In one aspect, the at least one mounting feature is a threaded hole configured to receive a threaded fastener after passing through a portion of the at least one heat-generating component.

In one aspect, the at least one heat-generating component is a payload component selected from a group consisting of phased array transmit and receive panels, a satellite network computer, and modem boards.

In one aspect, the spacecraft chassis further includes an open portion surrounding the at least one heat-generating component configured to dissipate heat of the at least one heat-generating component.

A spacecraft includes a chassis having a chassis body defined by first and second opposing sides bound by a perimeter and at least one heat dissipating feature that is configured to radiate heat into outer space. The spacecraft includes at least one heat-generating component mounted to the chassis body such that heat may be transferred from the least one heat-generating component to the chassis body.

In one aspect, the spacecraft further includes at least one mounting feature defined on at least one of the first and second opposing sides that is configured to secure the at least one heat-generating component directly to the chassis body.

In one aspect, the at least one mounting feature is a threaded hole defined in the chassis body that is configured to receive a threaded fastener after passing through a portion of the at least one heat-generating component.

In one aspect, a plurality of heat-generating components are mounted to the chassis body in a spaced arrangement such that an open chassis portion surrounding each of the plurality of heat-generating components substantially corresponds to an amount of heat to be dissipated from the heat-generating component to the chassis body.

In one aspect, the at least one heat dissipating feature is defined by a plurality of fins extending substantially transversely from a surface of at least one of the first and second opposing sides.

In one aspect, the chassis body is an elongated solid flat panel.

In one aspect, the at least one heat-generating component is a payload component selected from a group consisting of phased array transmit and receive panels, a satellite network computer, and modem boards.

In one aspect, the spacecraft further includes at least one power storage and distribution component mounted to the chassis body at substantially a center of the chassis body.

In one aspect, the at least one power storage and distribution component is one of a battery and a flight computer connected to the at least one heat-generating component through at least one power harness connection.

In one aspect, the spacecraft further includes at least one low heat component mounted to the chassis body near the perimeter of the chassis body.

In one aspect, the at least one low heat component is one of an antenna system, a star tracker, a magnetometer, a tracking and telemetry radio, a camera, a GPS antenna thruster, a thruster propellant container, a torque rod, a solar array steering actuator, and a reaction wheel.

In one aspect, the at least one low heat component is cantilevered from the chassis body.

In one aspect, the spacecraft has a power to mass ratio greater than 10 W/kg.

The embodiments of the disclosure in which an exclusive property or privilege is claimed are defined as follows:

1. A spacecraft chassis for a spacecraft, the spacecraft chassis comprising:
   a chassis body defined by first and second opposing sides bound by a perimeter, wherein the first side of the chassis body is configured to secure at least one heat-generating component thereto, and wherein the chassis body is configured as a primary structural support for the spacecraft; and at least one heat dissipating feature extending directly from a surface of the second side of the chassis body and configured to radiate heat generated from the at least one heat-generating component into outer space.

2. The spacecraft chassis of claim 1, wherein the at least one heat dissipating feature includes a plurality of fins extending substantially transversely from the surface of the second side.

3. The spacecraft chassis of claim 1, wherein the chassis body is an elongated solid flat panel.

4. The spacecraft chassis of claim 1, further comprising at least one mounting feature defined on the first side of the chassis body, wherein the at least one mounting feature is configured to secure the at least one heat-generating component directly to the chassis body.

5. The spacecraft chassis of claim 4, wherein the at least one mounting feature is a threaded hole configured to receive a threaded fastener after passing through a portion of the at least one heat-generating component.

6. The spacecraft chassis of claim 1, wherein the at least one heat-generating component is a payload component selected from a group consisting of phased array transmit and receive panels, a satellite network computer, and modem boards.

7. The spacecraft chassis of claim 1, further comprising an open portion surrounding the at least one heat-generating component configured to dissipate heat of the at least one heat-generating component.

8. A spacecraft, comprising:
a chassis, comprising:
a chassis body extending from a first edge of the spacecraft to an opposing second edge of the spacecraft, the chassis body defined by first and second opposing sides bound by a perimeter; and
at least one heat dissipating feature that is mounted directly to a surface of the second side of the chassis body and configured to radiate heat into outer space;
a solar array assembly carried by the chassis body; and
at least one heat-generating component mounted to the chassis body such that heat may be transferred from the least one heat-generating component to the chassis body.

9. The spacecraft of claim 8, further comprising at least one mounting feature defined on at least one of the first and second opposing sides that is configured to secure the at least one heat-generating component directly to the chassis body.

10. The spacecraft of claim 9, wherein the at least one mounting feature is a threaded hole defined in the chassis body that is configured to receive a threaded fastener after passing through a portion of the at least one heat-generating component.

11. The spacecraft of claim 8, wherein a plurality of heat-generating components are mounted to the chassis body in a spaced arrangement such that an open chassis portion surrounding each of the plurality of heat-generating components substantially corresponds to an amount of heat to be dissipated from the heat-generating component to the chassis body.

12. The spacecraft of claim 8, wherein the at least one heat dissipating feature is defined by a plurality of fins extending substantially transversely from the surface of the second side of the chassis body.

13. The spacecraft of claim 8, wherein the chassis body is an elongated solid flat panel.

14. The spacecraft of claim 8, wherein the at least one heat-generating component is a payload component selected from a group consisting of phased array transmit and receive panels, a satellite network computer, and modem boards.

15. The spacecraft of claim 8, further comprising at least one power storage and distribution component mounted to the chassis body at substantially a center of the chassis body.

16. The spacecraft of claim 15, wherein the at least one power storage and distribution component is one of a battery and a flight computer connected to the at least one heat-generating component through at least one power harness connection.

17. The spacecraft of claim 9, further comprising at least one low heat component mounted to the chassis body near the perimeter of the chassis body.

18. The spacecraft of claim 17, wherein the at least one low heat component is one of an antenna system, a star tracker, a magnetometer, a tracking and telemetry radio, a camera, a GPS antenna thruster, a thruster propellant container, a torque rod, a solar array steering actuator, and a reaction wheel.

19. The spacecraft of claim 17, wherein the at least one low heat component is cantilevered from the chassis body.

20. The spacecraft of claim 8 having a power to mass ratio greater than 10 W/kg.

* * * * *